United States Patent

Bloom

[15] 3,654,748
[45] Apr. 11, 1972

[54] MULTISTAGE LIQUID AND GAS SEPARATOR

[72] Inventor: Carl Bloom, Springfield, Mass.
[73] Assignee: Worthington Corporation, Holyoke, Mass.
[22] Filed: Feb. 26, 1970
[21] Appl. No.: 14,306

[52] U.S. Cl. ..........................55/322, 55/319, 55/325, 55/330, 55/337, 55/345, 55/399, 55/423, 55/456, 55/458, 55/461, 55/465, 55/481, 55/509, 55/510, 55/527
[51] Int. Cl. ..........................B01d 45/12
[58] Field of Search ..........................55/337, 447, 456–457, 55/453, 315, 318–319, 320–333, 392, 394, 396, 447–450, 458–459, 497–498, 500, 434, 436, 235, 481, 461, DIG. 23; 210/304

[56] References Cited

UNITED STATES PATENTS

| | | | |
|---|---|---|---|
| 2,848,060 | 8/1958 | McBride et al. | 55/325 |
| 2,191,190 | 2/1940 | De Guire | 55/461 |
| 2,557,332 | 6/1951 | Wright | 55/436 |
| 3,386,230 | 6/1968 | Riesberg et al. | 55/457 X |
| 1,344,146 | 6/1920 | Peck | 55/461 X |
| 2,659,450 | 11/1953 | Baird | 55/396 |
| 1,240,368 | 9/1917 | Reese | 55/447 X |
| 3,528,221 | 9/1970 | Garrett et al. | 55/461 X |
| 1,791,732 | 2/1931 | Manchester | 55/337 UX |

Primary Examiner—Dennis E. Talbert, Jr.
Assistant Examiner—Vincent Gifford
Attorney—Fishman and Van Kirk

[57] ABSTRACT

A liquid and gas separator having a primary stage including an agglomerator cartridge and a secondary stage providing the discharge path for the gas and liquid mixture passing from the primary stage. The secondary stage includes a chamber in which a baffle formed by a plurality of convolutions guides the gas and agglomerated liquid in a spiral path to centrifuge the liquid. The centrifuged liquid is thrown against the baffle and chamber walls and drains to a scavenging port while the liquid-free gas is discharged through a separate port.

12 Claims, 3 Drawing Figures

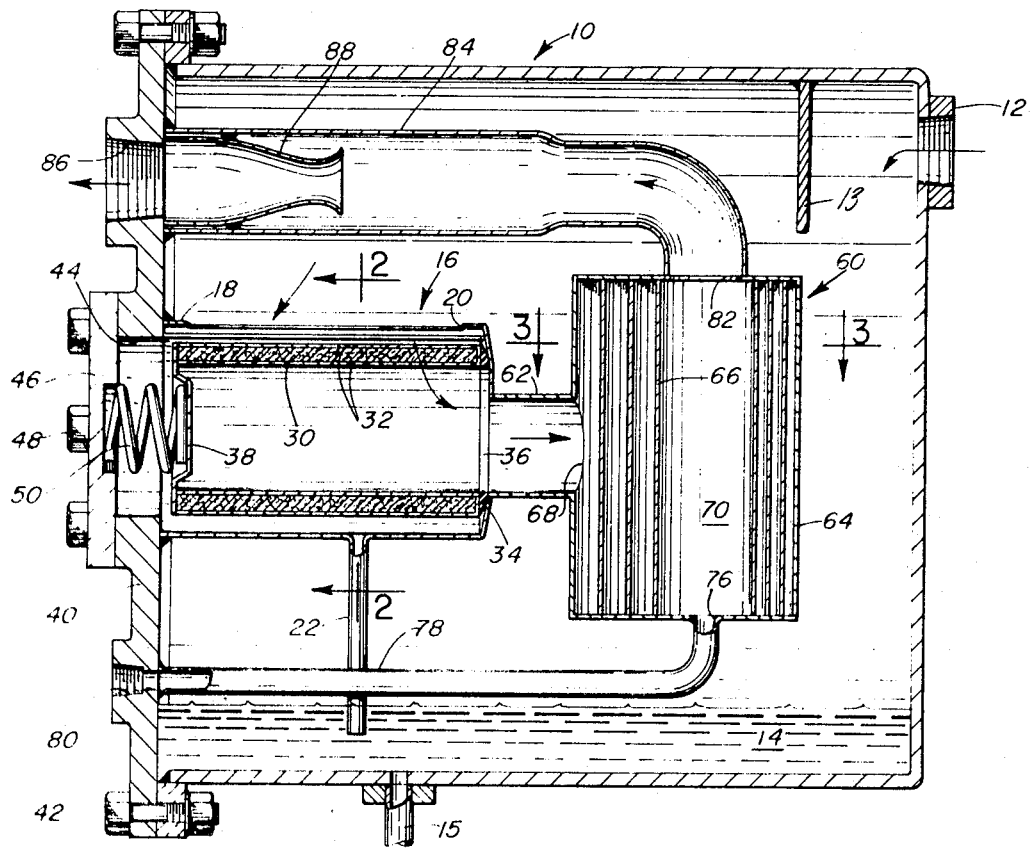
Fig. 1
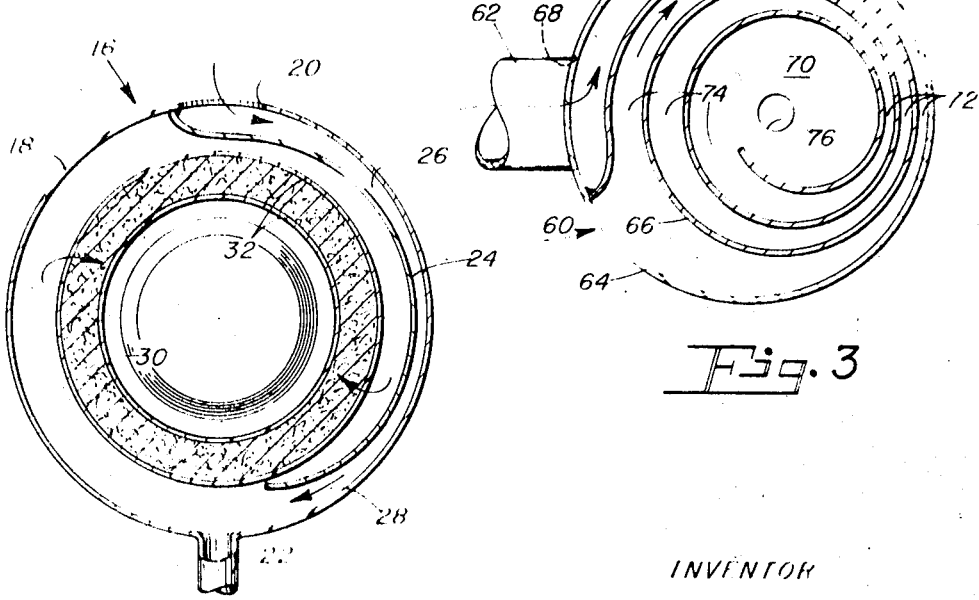
Fig. 2
Fig. 3
INVENTOR
CARL BLOOM
BY Fishman & Van Kirk
Attorneys 3,654,748

MULTISTAGE LIQUID AND GAS SEPARATOR

A related liquid and gas separator is shown in my copending application U.S. Pat. application No. 13,872, filed Feb. 25, 1970 having the same assignee.

BACKGROUND OF THE INVENTION

1. Field of the Invention

The invention relates to the field of liquid and gas separators which employ both agglomerating and centrifugal separating stages through which the liquid and gas mixture passes serially during the separating process.

2. Description of the Prior Art

Liquid and gas separators which employ a plurality of stages for filtering or separating the liquid and gas mixture are well know in the art. Such devices have a multitude of applications wherever either purified gas mixture, or a purified liquid or both purified liquid and gas are desired. An example of the latter situation is commonly found in rotary vane or screw-type gas compressors where lubricating oil is injected into the compressor to cool and lubricate the compressor as it is operating. The high pressure air leaving the compressor is laden with a great deal of the lubricating oil. It is desirable to have the air purified for use with various pneumatic devices, such as air hammers, and to have the oil returned to a reservoir for recirculation through the lubricating system of the compressor.

Liquid and gas separators which are particularly adapted to air and oil mixtures often employ an agglomerator cartridge through which the oil laden air is passed. The cartridge causes the finely divided, atomized particles of oil to agglomerate in large droplets. The heavier droplets react more significantly to inertial forces than the atomized particles and consequently large quantities of oil can be more easily removed from an air flow by centrifugal separators. If the air stream has a fairly high velocity, the stream may recapture atomized particles from the previously agglomerated oil. For these reasons, efficient centrifugal separators used in series with the agglomerator cartridges are desirable.

SUMMARY OF THE INVENTION

The present invention relates to an improved, multistage liquid and gas separator. The multistage separator employs an agglomerator cartridge and a centrifugal separator which operates on the gas and liquid mixture expelled from the cartridge.

The agglomerator cartridge which forms a principal portion of the initial or primary separating stage is mounted in a tank that receives the liquid and gas mixture. The cartridge and its casing are mounted to one wall of the tank and if desired a removable cover plate may be added to the external side of the wall to allow access to the agglomerator cartridge for inspection or replacement.

The centrifugal separator in this invention is the final or secondary separating stage and is an improved centrifugal separator which receives the liquid and gas mixture after it has passed through the agglomerator cartridge. The separator is basically a cylindrical chamber positioned vertically within the tank and includes a spiral baffle plate which leads from an inlet aperture in the cylindrical wall of the chamber to the central core of the chamber. The mixture entering the chamber is forced into the spiral channel formed by the baffle. The heavier liquid particles agglomerated in a first stage of the separator are caused to impinge on the walls of the chamber and the baffle as the gas continues to the central core. A gas exit aperture formed in the central portion of the chamber ceiling removes the liquid-free gas from the core and a liquid scavenging drain in a central portion of the chamber floor removes the centrifuged liquid.

The convolutions formed by the spiral baffle plate are closely spaced along one radial of the cylindrical chamber and conversely are more widely spaced along the opposite radial. The spacing forms venturi and diffuser sections which will alternately accelerate and decelerate the mixture flowing through the spiral channel to supplement the centrifuging process.

The initial and final separating stages are preferably both supported by the same wall of the tank. Such construction permits easy access to both the separators and the connections to the tank.

BRIEF DESCRIPTION OF THE DRAWINGS

FIG. 1 is a sectional view of a tank including a primary separating stage with an agglomerating cartridge and the secondary centrifugal separating stage which ingests the mixture from the agglomerating cartridge.

FIG. 2 is a sectional view of the primary separating stage along the line 2—2 of FIG. 1.

FIG. 3 is a sectional view of the secondary centrifugal separating stage along the line 3—3 of FIG. 1.

DESCRIPTION OF THE PREFERRED EMBODIMENTS

Reference to FIG. 1 shows my improved liquid and gas separator in a sectional view.

As indicated by the arrows the liquid and gas mixture enters the tank 10 through a fitting 12 connected to one end wall of the tank and is deflected downwardly by baffle 13. The fitting 12 may be connected to the discharge manifold of a rotary vane compressor in which event the tank would be more commonly known as a demister tank for separating an air and oil mixture. Heavy particles of liquid entrained in the gas stream entering fitting 12 may immediately fall to the pool 14 of liquid in the bottom of the tank as the deflected gas stream decelerates. If desired, the pool 14 may be drained through a convenient outlet 15 or simply stored in the tank 10 for removal at periodic intervals.

Once in the tank, the liquid and gas mixture drifts toward the primary separator generally designated by numeral 16. This separator has a cylindrical outer casing 18 including a longitudinal inlet slot 20 at its top side and a liquid drain line 22 at the bottom side. As seen more clearly in FIG. 2, the mixture entering the casing 18 is forced to follow the inner surface of the casing 18 by a baffle 24 which runs circumferentially from the inlet 20 along one side of the casing 18. The baffle 24 is specially shaped to form a venturi section 26 and a diffuser section 28. The venturi section 26 causes the inflowing mixture to be accelerated to a higher speed as it follows the cylindrical inner wall of casing 18. Some liquid particles entrained in the mixture are centrifuged against the inner surface of casing 18 and eventually flow by gravity to the drain line 22. The diffuser section 28 decelerates the mixture and therefore prevents the centrifuged liquid from being recaptured or aspirated in a high velocity gas stream. The mixture will continue to circulate around the inner surface of casing 18 and baffle 24 and thusly will continue the centrifuging process. Eventually, the mixture passes through an agglomerator cartridge 30 centrally positioned within the casing 18. The cartridge 30 consists of sheets of porous, filter material made from natural, plastic, glass or other fibers and causes the finely divided particles to coalesce in droplets. The cartridge may be held in its cylindrical shape by means of a perforated cage structure 32. At one end of the cartridge in FIG. 1 a seal 34 prevents the mixture from by-passing the cartridge and flowing directly to the centrally located outlet 36 in an end wall of casing 18. At the opposite end of the cartridge a closed cap 38 forming a part of the cage 32 seals the internal side of the cartridge from the external side.

The casing 18 is mounted to the end wall 40 of the tank 10 by welds or any other convenient attachment. The end wall 40 may be a removable end wall secured to the remainder of the tank 10 by clamping bolts 42. Alternately, the wall 40 may be welded directly to the remainder of the tank to provide a less expensive construction. An access hole 44 and a cover plate 46 held by a plurality of bolts 48 to the wall 40 are coaxially aligned with the cylindrical casing 18. A cartridge spring 50 is sandwiched between the cover plate 46 and the cap 38 and urges the cartridge 30 with seals 34 into contact with the wall of casing 18 surrounding the outlet 36. The removable cover plate 46 permits the cartridge 30 to be removed for inspection or replacement.

It will be understood that the centrifuging action of the baffle 24 removes a portion of the liquid entrained in the mixture ingested by the primary separator 16. The centrifuged liquid flows by gravity to drain line 22. Drain line 22 extends from the separator 16 to below the surface of pool 14 since the slightly higher pressure outside of the casing 18 would inhibit the draining of centrifuged liquid through a drain hole in the bottom of casing 18. A short column of liquid above the pool surface in the line 22 maintains the lower pressure at the junction of the casing 18 and the line 22 while the separator 16 is in operation.

Another portion of the liquid ingested by the separator 16 is agglomerated in the cartridge 30 and may form droplets large enough to be pulled by gravity from the cartridge through the drain line 22. The remaining liquid agglomerated on cartridge 30 is recaptured in droplets by the gas flow as part of the first stage separating process. The recaptured portion of the liquid continues with the gas through the outlet 36. For this reason my invention includes an improved secondary separator forming the discharge mechanism from the primary separator 16.

The secondary separator, generally designated by numeral 60, receives the mixture with the agglomerated droplets through an interconnecting duct 62. The secondary separator 60 is a closed vertical, cylindrical chamber 64 with an internal spiral baffle plate 66 extending from the ceiling to the floor of the chamber 64. As indicated more clearly by the arrows in FIG. 3, the mixture enters chamber 64 from duct 62 at an aperture 68 in the cylindrical wall of the chamber 64 and is immediately directed in a circumferential path along the inner surface of chamber 64 by the spiral baffle plate 66. The spiral channel formed by baffle plate 66 terminates in a large central chamber core 70 defined by the inner convolution of the baffle 66.

As particularly noted in FIG. 3, the convolutions of plate 66 are closely spaced along one chamber radial lying opposite the entrance 68. The convolutions are more widely spaced at the opposite radial. This spacing of the convolutions forms alternating venturi sections 72 and diffusing sections 74 in the spiral channel which will cause the mixture to be alternately accelerated and decelerated respectively as it passes to the central core 70. The droplets of liquid suspended in the gas will be influenced by gravity more significantly in the diffusing sections and consequently will tend to drop more rapidly in the diffusing sections to lower portions of chamber 64. The venturi sections 72 will tend to accelerate the gas and the droplets and consequently will generate greater centrifugal forces to impel the droplets against the walls of chamber 64 or the baffle plate 66. Again, gravity will tend to pull the centrifuged droplets adhering to the walls and plate to lower portions of the chamber 64. As a result, both the venturi sections 72 and the diffuser sections 74 supplement what would otherwise be a simple centrifugal separating process. Liquid which reaches the lower portion of chamber 64 will eventually pass through the spiral channel into the central core of the chamber 64.

The inner convolution of the baffle plate 66 terminates at a point in the convolution which forms a diffusing section in the spiral channel. The gas flowing in the spiral channel at this point will be decelerated in this diffusing section to join the relatively low velocity gas in the central core 70 with a minimum of turbulence. Minimizing this turbulence aids in the settling of the remaining liquid to the floor of chamber 64.

A centrally located scavenging drain 76 in the floor of chamber 64 empties into a duct 78 which leads to a liquid scavenging port 80 in wall 40. If the tank 10 is a demister tank operating with a rotary compressor, the scavenging port 80 may be connected to the low pressure suction inlet of the compressor.

Since the liquid entrained in the mixture entering chamber 64 gravitates toward the floor of chamber 64, liquid-free gas will be found in the upper portion of the chamber core 70. Accordingly, the ceiling of chamber 64 includes a gas exit 82 which is connected by a discharge duct 84 to a discharge port 86 in wall 40.

The terminal end of discharge duct 84 includes a discharge nozzle 88 through which the liquid-free gas must pass in order to reach port 86. The discharge nozzle 88 has a venturi form in which the throat is specifically sized to provide choked flow at a desired minimum upstream pressure. For various reasons it may be preferred to maintain a pressure no less than a given value at some point upstream of nozzle 88, such as the oil reservoir which feeds oil to the rotary compressor that discharges the mixture into tank 10. The discharge nozzle 88 will maintain the desired pressure at choked flow regardless of the pressure at discharge port 86. The nozzle and its function are described in greater detail in U.S. Pat. No. 3,318,514 issued May 9, 1967 to R. O. Garbus.

It will be understood that various modifications can be made to the disclosed structure without departing from the spirit and scope of the invention. For example, it is not essential to the separating function that all components be mounted on plate 40. Such construction, however, permits the discharging connections and the access plate 46 to be located at one side of the tank which may be conveniently exposed externally for accessibility. While the venturi sections 72 and diffuser sections 74 defined by the spiral baffle 66 are located along diametrically opposite radials, it is feasible that more than one venturi and diffuser section can be formed between consecutive convolutions by specially forming the spiral baffle plate 66. In such case, the locations of the venturi and diffuser sections will not be along diametrically opposite radials. While the discharge nozzle 88 is conveniently located in the discharge duct 84, the nozzle itself is not essential to the separating process and consequently may be deleted without destroying the utility of my multistage separator.

Having thus described my invention I claim:

1. A liquid and gas separating device comprising:
   a housing defining a demister chamber for receiving a liquid and gas mixture and having an end member including a gas discharge port and a liquid scavenging port;
   a primary separator mounted within the demister chamber to the end member and having a mixture inlet and a mixture outlet;
   a cylindrical separating chamber positioned in the housing, said separating chamber having a mixture entrance in its cylindrical outer wall, said separating chamber further having oppositely disposed end walls, a gas exit being located in one of said end walls and a liquid exit being located in the other end wall;
   a baffle plate sandwiched between the end walls of the cylindrical separating chamber and having a coiled shape in a plane transverse to the axis of the cylindrical separating chamber, the radially outer end of the baffle being connected to the wall of the cylindrical separating chamber adjacent the mixture entrance and the inner end of the baffle terminating adjacent the gas and liquid exits to define an open core of the separating chamber communicating at opposite ends with the gas exit and liquid exit respectively;
   a conduit for liquid connected between the liquid exit of the cylindrical separating chamber and the liquid scavenging port of the housing;
   a gas discharging conduit connected between the gas exit of the cylindrical separating chamber and the gas discharge port of the housing; and
   a conduit providing communication between the mixture outlet of said primary separator and the mixture entrance of said cylindrical separating chamber.

2. The separating device of claim 1 wherein:
   the gas discharging conduit includes a venturi section, the throat of the venturi section having a cross-sectional area providing choked flow at a preselected pressure of the liquid and gas mixture received by the housing.

3. The separating device of claim 1 wherein:
the end member of the housing is a removable end member; and
the cylindrical separating chamber, the conduit for liquid and the gas discharging conduit are supported within the housing from the removable end member.

4. The separating device of claim 3 wherein:
the removable end member includes an access port and a removable cover plate over the access port; and
the primary separator is mounted adjacent the access port and includes an agglomerator cartridge having a size commensurate with the access port for removal therethrough.

5. The separating device of claim 1 wherein:
the primary separator includes an agglomerator cartridge adjacent the mixture outlet in the primary separator for agglomerating the liquid particles in the mixture upstream of the mixture entrance in the cylindrical separating chamber.

6. Apparatus for separating a liquid and a gas mixture comprising:
a tank having a receiving aperture for receiving the liquid and gas mixture and an exit aperture for discharging the separated gas;
a first separating stage mounted within the tank and having a mixture inlet exposed to the region within the tank and a mixture outlet;
a second separating stage mounted within the tank and having a generally cylindrical hollow body member defining a mixture entrance connected with the mixture outlet of said first separating stage, said second separating stage also having two end members, one of said end members defining a gas exit, said second separating stage further having a spiral baffle positioned within and substantially coaxially of the cylindrical body member, said baffle being attached to the inner surface of the body member to form an inwardly spiralling channel extending from the mixture entrance to a region coaxial with the gas exit in the one end member, the radially contiguous portions of the spiral baffle along a first radial of the cylindrical body member being more closely spaced than along other radials to form alternating narrow sections and expanded sections in the spiral channel; and
conduit means connected between the gas exit in the one end member of the second separating stage and the exit aperture of the tank.

7. The apparatus of claim 6 wherein: the other end member of the second separating stage opposite to the one end member defines a liquid scavenging drain.

8. The apparatus of claim 6 wherein:
the inner portion of the spiral baffle terminates at a second radial of the cylindrical body member displaced from the first radial in the direction of gas flow through the spiral channel by an amount no greater than 180° whereby the channel terminates in an expanded section.

9. The apparatus of claim 6 wherein:
a. the gas exit in said second separating stage one end member is a centrally located circular aperture having a given radius; and
b. the inner end of the spiral baffle in the direction of gas flow terminates at a redial distance from the center of the second separating stage body member greater than the given radius of the gas exist.

10. In a compressed gas demister tank having an inlet port, a gas discharge port, an oil scavenging port and a primary internal liquid and gas separator, an improved secondary separator comprising:
a chamber within the demister tank and having a cylindrical inner surface including a first aperture, the cylindrical surface being vertically positioned with respect to the operating position of the demister tank, a ceiling surface defining a centrally located second aperture and a floor surface defining a centrally located third aperture;
a chamber partition extending from the ceiling surface to the floor surface and extending from the cylindrical chamber surface and first aperture to the central region of the chamber contiguous to the second and third apertures in a plurality of convolutions generally parallel with the cylindrical surface, at least two of the plurality of convolutions of the partition being closely spaced at one radial and widely spaced at a radial substantially opposite the one radial whereby venturi and diffusing sections are formed in the spiral channel defined by the partition;
first conduit means connecting the primary separator with the first aperture of the chamber;
second conduit means connecting the second aperture of the chamber with the gas discharge port of the demister tank; and
third conduit means connecting the third aperture of the chamber with the oil scavenging port of the demister tank.

11. The improved separator of claim 10 wherein:
all of the plurality of convolutions are closely spaced at the one radial and widely spaced at the substantially opposite radial whereby a number of venturi and diffusing sections are alternately formed along the spiral channel.

12. The improved separator of claim 11 wherein:
the innermost convolution terminates in the vicinity of the opposite radial whereby the spiral channel terminates in a diffuser section.

* * * * *